United States Patent Office 3,534,459
Patented Oct. 20, 1970

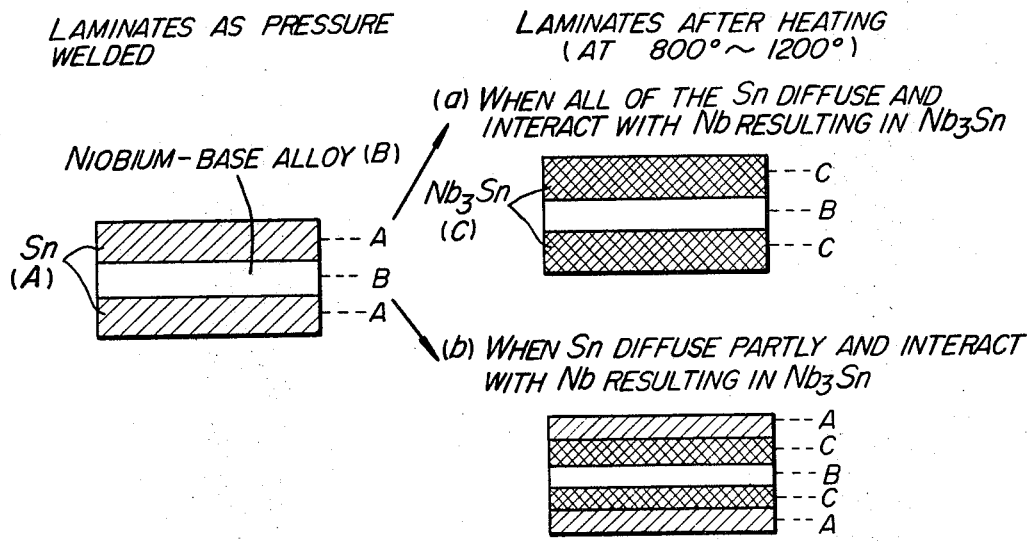
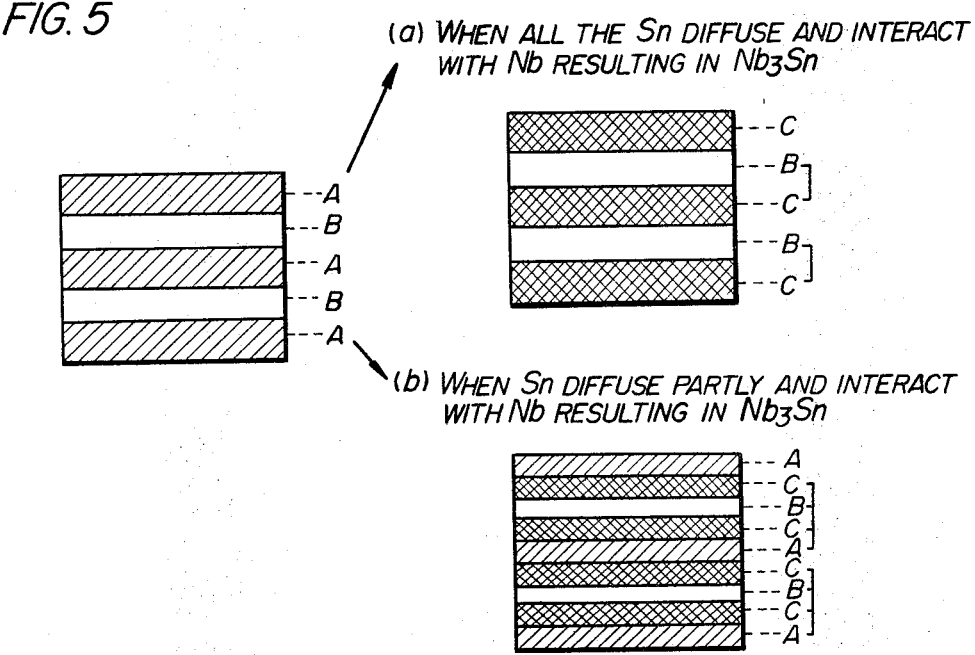

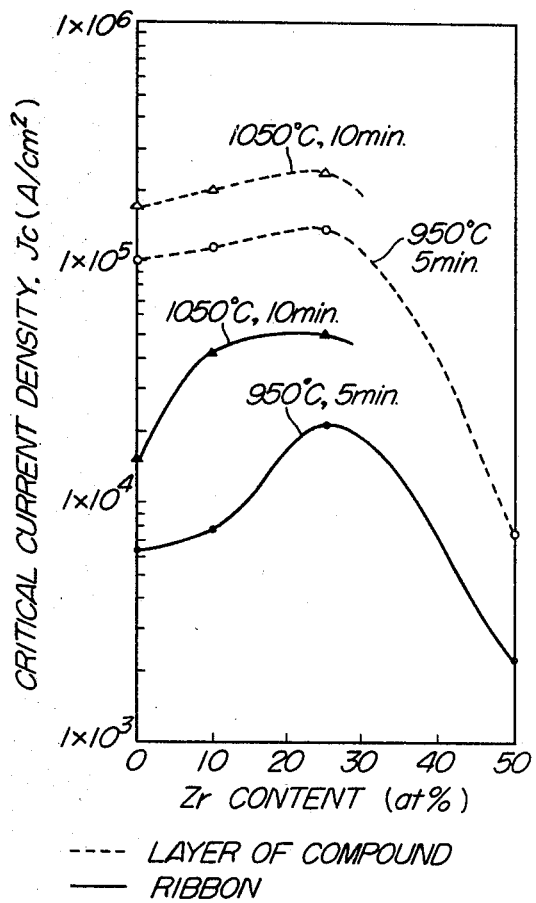

3,534,459
COMPOSITE SUPERCONDUCTING ELEMENTS
Mitsuhiro Kudo, Hachioji-shi, and Toshio Doi, Tokyo, Japan, assignors to Hitachi, Ltd., Tokyo, Japan, a corporation of Japan
Filed Mar. 31, 1967, Ser. No. 627,347
Claims priority, application Japan, Apr. 6, 1966, 41/21,198, 41/21,199
Int. Cl. B32b 15/00
U.S. Cl. 29—194                                                   6 Claims

ABSTRACT OF THE DISCLOSURE

A composite superconducting element having an improved superconductivity comprising a multilayer laminate of (1) tin, niobium stannide, niobium-base alloy, niobium stannide, tin, niobium stannide . . . niobium stannide and tin in the order and (2) niobium stannide, niobium-base alloy, niobium stannide, niobium-base alloy . . . niobium-base alloy and niobium stannide in the order, said niobium stannide which is a solid solution containing the additive metallic elements in the niobium-base alloy and said niobium-base alloy being selected from the group consisting of Zr-Nb alloy containing 5 to 30 atom percent of Zr, Ti-Nb alloy containing 5 to 30 atom percent of Ti, Zr-Ti-Nb alloy containing 5 to 30 atom percent of a sum of Zr and Ti, Ta-Nb alloy containing 5 to 30 atom percent of Ta and Zr-Ta-Nb alloy containing 5 to 30 atom percent of a sum of Zr and Ta. A method of making a composite superconducting element, comprising laminating thin tin strips and thin niobium-base alloy strips in the order of tin, niobium-base alloy, tin, niobium-base alloy . . . niobium-base alloy and tin, pressure welding said strips with each other by cold rolling, heating the resultant laminate to a temperature of 800 to 1200° C. to cause diffusion between the tin and niobium-base alloy and thereby to form a niobium stannide layer at the boundary therebetween or on the surface of each niobium-base alloy layer.

BACKGROUND OF THE INVENTION

Field of the invention

The present invention relates to composite superconducting element composed of a plurality of layers of superconducting intermetallic compound and superconducting alloy, and a method of making the same.

Superconductivity is the property of a substance which results in the electric resistance of the substance being reduced to zero when said substance is cooled to a very cold temperature, such as the temperature of liquid helium. Substances having such property, i.e. superconducting materials, are characterized by the following three parameters. Namely, they are critical temperature Tc (the temperature below which a substance concerned becomes superconductive), critical magnetic field Hc (the field of a strength above which the superconductivity of a substance concerned is destroyed) and critical current Ic or critical current density Jc (the current capacity above which the superconductivity of a substance concerned is destroyed). The values of these three parameters are usually required to be as high as possible for the superconducting materials which are used as a coil winding for high magnetic field generating apparatus such as superconducting magnet.

Description of the prior art

Conventional superconducting materials are generally categorized into alloy-type materials, such as Nb-Zr, Nb-Ti and Mo-Re alloys, and intermetallic compound-type materials, such as $Nb_3Sn$ and $V_3Ga$. The critical field of the former is about 100 KOe at highest, so that, while the materials of this type are usable with a considerably large superconducting current in a field below the value mentioned above, they are not serviceable at all in a field above said value. In contrast thereto, the critical field of the latter type is as high as from 100 to 200 KOe and further the materials of this type can be used with a considerably large superconducting current in a field of a strength up to said value. It is for this reason that the materials of the latter type are regarded as most superior of all superconducting materials presently known. However, whereas the materials of the former type are relatively easy in plastic deformation, such as rolling or wire drawing, because of being alloys, the materials of the latter type, which are compounds, are hard and brittle, and therefore not easy in plastic deformation as described above. In addition, even if the materials are formed into a wire of small diameter by some means, the wire has an insufficient flexibility, so that it is not easy to form it into a coil.

Several methods have been proposed in order to solve the problems encountered during plastic deformation of the intermetallic compounds. These methods include (1) one which comprises filling a niobium tube with a mixed powder of niobium and tin, drawing said tube into an elongated state and causing reaction between the niobium and tin powders in the tube by heating them to about 1000° C. to give niobium stannide represented by $Nb_3Sn$; (2) one which comprises depositing tin or gallium on the surface of a niobium or vanadium wire by means of vapour deposition or electroplating and heating the wire to 900 to 1000° C. to form a layer of $Nb_3Sn$ or $V_3Ga$ on said wire; or (3) one which comprises heating of non-superconducting metal or alloy and feeding a mixed vapour of, e.g. niobium chloride or stannous chloride, and hydrogen to form a layer of $Nb_3Sn$ on said wire.

All of these methods have been developed in an attempt of eliminating the aforementioned drawbacks of the compound-type superconducting materials by carrying the brittle compound on a flexible metal or alloy so that the brittle compound may be flexed to some extent along with the wire. The materials of this form are referred to as composite superconducting elements.

However, method (1) tends to result in seizing of niobium during the drawing process, rendering the work difficult, whereas method (2) necessitates the use of a drawing or rolling device for the formation of an elongate wire or ribbon and also a device for carrying out the vapour deposition or electroplating. Method (3), on the other hand, has the drawback that not only is the control of the mixed vapour cumbersome but also corrosive and toxic gases are generated during the process.

SUMMARY OF THE INVENTION

An object of the present invention is to provide a composite superconducting element having an improved superconductivty.

The method of the present invention comprises laminating thin tin strips and thin superconducting niobium-base alloy strips in the order of tin, niobium-base alloy, tin, niobium-base alloy . . . niobium-base alloy and tin, pressure welding the strips in the laminate with each other by cold rolling, heating the laminate for a period from several minutes to several hours at a temperature from 800 to 1200° C. to cause diffusion between the tin and niobium alloy and thereby to react them with each other. In this case, by suitably selecting the thickness of the tin and niobium alloy strips and the degree of diffusion or the heating temperature and heating period, two types of composite elements are obtained which are (1) an element of the type composed of a multilayer laminate of tin-niobium stannide-niobium-base alloy-niobium stannide-tin-niobium stannide ... niobium stannide-tin, in other words, a multilayer laminate composed of an outermost layer of tin followed by a series of layers each of the series consisting of a layer of niobium stannide, a layer of niobium-base alloy, a layer of niobium stannide and a layer of tin, in sequence, thereby the outermost layers are always tin. This can be formulated as A—C-B-C-A—C-B-C-A—C-B-C-A . . . and so on, if letters A, C, and B are designated to represent tin, niobium stannide and niobium-base alloy, respectively, and is illustrated in FIGS. 4(b) and 5(b) and (2) a material of the type composed of a multilayer laminate of niobium stannide-niobium-base alloy-niobium stannide . . . niobium-base alloy-niobium stannide.

Alternatively, this can be expressed as a multilayer laminate composed of an outermost layer of niobium stannide followed by a series of layers each of the series consisting of a layer of niobium-base alloy and a layer of niobium stannide, this means the other opposite outermost layer always ends in niobium stannide.

This can be schematically expressed as

C—B-C—B-C—B-C . . . and so on.

B and C denote niobium-base alloy and niobium stannide. See FIGS. 4(a) and 5(a).

For clarification we will explain with respect to the most simple case where the laminate is pressure welded above without any subsequent heating consists of three layers only, namely a composite superconducting element comprising a niobium-base alloy on both faces of which are set thin strips of tin, as illustrated in FIG. 4. The laminate thus formed is subjected to heat at 800°–1200° C. for a period of time during which mutual diffusion of the constituents of the lamination takes place.

In the case where Sn is completely diffused into the Nb-base alloy the composite superconducting element consists essentially of three layers, a section of the niobium-base alloy in the center with niobium stannide on both outer faces. When only partial diffusion has taken place it will be found that the order of the respective layers comprise Sn, $Nb_3Sn$ and Sn. This means that both outermost layers are composed of Sn.

The niobium-base alloys usable in the present invention include Zr-Nb alloy containing 5 to 30 atom percent of Zr, Ti-Nb alloy containing 5 to 30 atom percent of Ti, Zr-Ti-Nb alloy containing 5 to 30 atom percent of a sum of Zr and Ti, Ta-Nb alloy containing 5 to 30 atom percent of Ta, and Zr-Ta-Nb alloy containing 5 to 30 atom percent of a sum of Zr and Ta.

The niobium stannide resulting from the reaction between the tin and alloy in the manner described above is a solid solution containing the additive metallic elements in the niobium-base alloy and, therefore, has a critical temperature and a critical current higher than those of pure niobium stannide. Thus, it will be seen that the inventive composite superconducting elements are usable with a larger current than that which can be conducted through the conventional composite superconducting elements having the same dimensions.

It will also be seen from the foregoing description that the method of this invention may be carried out only with a small rolling mill and a small electric furnace, no other facilities being required. Therefore, the operation is easy and the facility cost is minimized.

The elements according to this invention have a considerable flexibility owing to their multilayer structure wherein the compound layer are held by the niobium alloy layers. In particular, the elements produced by method (1) described above have a greater flexibility than the elements produced by method (2) owing to the outermost layers being formed of tin. The presence of the tin layers on both sides of the element is also effective in preventing generation and expansion of the heat resulting from flux creep or flux jump caused by the exterior field or self field, because, under the normal conducting state, tin is substantially superior to the niobium alloy in heat and electric conductivity, though considerably inferior to copper and aluminum.

As can be appreciated, such generation and expansion of heat resulting from the flux creep or flux jump may be prevented more effectively by coating the inventive element with copper or aluminum by vapor deposition or electroplating.

BRIEF DESCRIPTION OF THE DRAWINGS

The present invention will be more clearly understood from the following detailed description when taken in conjunction with the accompanying drawings, in which:

FIG. 3 is a chart illustrating the critical current density Jc of the inventive composite superconducting element relative to the composition of the alloy used therein.

FIGS. 4 and 5 show the composition of the laminates before and after the heating step.

DESCRIPTION OF THE PREFERRED EXAMPLES

Figure 1:
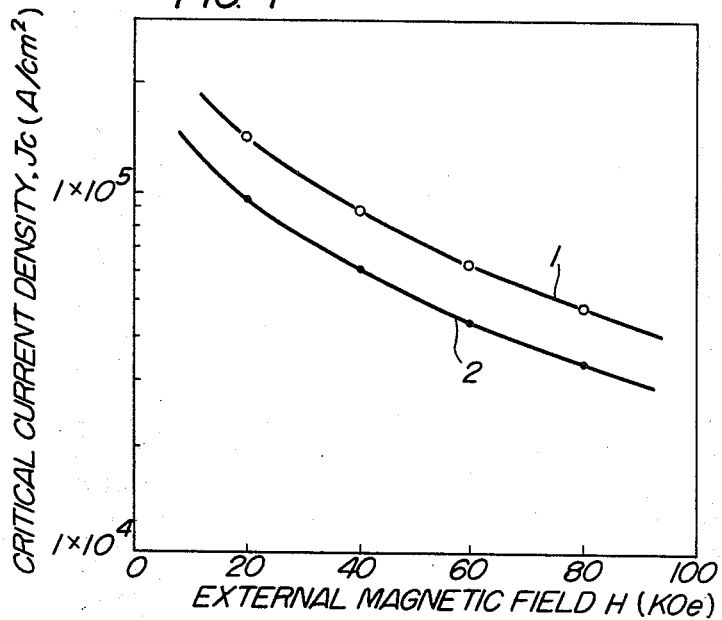
FIGS. 1 and 2 are charts illustrating the relationship between the critical current density Jc and exterior field H of the inventive and conventional composite superconducting element respectively.

The present invention will be described more specifically hereinbelow by way of example.

EXAMPLE 1

A 0.5 x 10 x 500 mm. niobium alloy strip containing 25 atom percent of zirconium and two 0.05 x 10 x 500 mm. pure tin strips were laminated in three layers with the zirconium strip interposed between the pure tin strips. The laminate thus formed was reduced to a thickness of 50 microns by cold rolling without previously subjecting it to an intermediate annealing. Then, the resultant laminate was subjected to heat treatment in an argon atmosphere at a temperature of 700 to 1000° C. for 10 minutes, 1 hour and 5 hours.

After the heat treatment, the product material had a five-layer structure composed of tin-niobium stannide which is a solid solution containing zirconium-niobium-zirconium alloy-niobium stannide which is a solid solution containing zirconium-tin in the order mentioned. The material had a considerable mechanical strength and a sufficient flexibility, since the niobium stannide layers are held between the tin layer and the niobium-zirconium alloy layer respectively.

Specimens of 1 mm. in width and 50 mm. in length were cut out from the element and placed at right angles to an exterior field H at 4.2° K. to measure the critical current Ic. The measurements of Ic for these specimens at an exterior field of 60 and 80 KOe are shown in Table 1. For control, specimens were produced in the same manner as described above, except that pure niobium strip was used in place of the niobium-zirconium alloy strip as in the case of conventional element, and Ic for these specimens were measured, the result of which is shown in Table 2. The control specimens had a five-layer structure composed of the outermost layers of tin and intermediate layers of pure niobium stannide.

The values of Ic shown in the tables below are only of the compound layers and are in terms of $A/cm.^2$.

TABLE 1

| Specimen | Treatment | Exterior field 60 KOe. | 80 KOe. |
|---|---|---|---|
| A | Pressure welding only | 0 | 0 |
| B | Heat treatment of A at 1000° C. for 10 minutes | $3.1 \times 10^5$ | $2.4 \times 10^5$ |
| C | Bending of B at 4.5r | $2.4 \times 10^5$ | $1.9 \times 10^5$ |
| D | Heat treatment of A 1000° C. for 1 hour | $2.2 \times 10^5$ | $1.7 \times 10^5$ |
| E | Bending of A at 4.5r | $1.3 \times 10^5$ | $1.0 \times 10^5$ |
| F | Heat treatment of A at 1000° C. for 5 hours | $1.3 \times 10^5$ | $1.2 \times 10^5$ |
| G | Bending of F at 4.5r | $1.0 \times 10^5$ | $8.0 \times 10^4$ |
| H | Heat treatment of A at 800° C. for 1 hour | $2.2 \times 10^3$ | $1.1 \times 10^3$ |
| I | Heat treatment of A at 700° C. for 1 hour | $2.2 \times 10^2$ | $7.0 \times 10^1$ |

TABLE 2

| Specimen | Treatment | Exterior field 60 KOe. | 80 KOe. |
|---|---|---|---|
| A′ | Pressure welding only | 0 | 0 |
| B′ | Heat treatment of A′ at 1000° C. for 10 minutes | 2.2×10⁵ | 1.7×10⁵ |
| C′ | Bending of B′ at 4.5r | 1.5×10⁵ | 1.1×10⁵ |
| D′ | Heat treatment of A′ at 1000° C. for 1 hour | 1.8×10⁵ | 1.3×10⁵ |
| E′ | Bending of D′ at 4.5r | 1.1×10⁵ | 8.0×10⁴ |
| F′ | Heat treatment of A′ at 1000° C. for 5 hours | 1.1×10⁵ | 8.0×10⁴ |
| G′ | Bending of F′ at 4.5r | 7.0×10⁴ | 5.0×10⁴ |
| H′ | Heat treatment of A′ at 800° C. for 1 hour | 2.0×10³ | 1.0×10³ |
| I′ | Heat treatment of A′ at 700° C. for 1 hour | 1.0×10² | 6.0×10¹ |

It will be seen in the tables that, while both elements are common in that the Ic characteristic may be improved by heat treatment at a temperature of 800 to 1000° C. and in that the Ic characteristic will not be deteriorated by bending, the Ic characteristic of the inventive element is far superior to that of the conventional one, through the reason therefor is not understood.

The relationship between exterior field H and critical current Ic of the specimen B in Table 1 and specimen B′ in Table 2 are shown in the chart of FIG. 1. In the chart, curve 1 represents the Ic measurements taken on the specimen B and curve 2 the Ic measurements taken on the specimen B′.

As can be clearly seen in the chart, the specimen B of the element according to the present invention, which comprises an alloy layer, can be used with a superconducting current which is always greater than that which can be conducted through the specimen B′ of the conventional element of the same dimensions, which comprises a pure niobium layer.

EXAMPLE 2

A 0.5 x 10 x 500 mm. niobium alloy strip containing 25 atomic percent of zirconium and two 0.01 x 10 x 500 mm. pure tin strips were laminated in three layers with the former interposed between the latter, and the laminate thus formed was reduced to a thickness of 50 microns by cold rolling, without previously subjecting it to an intermediate annealing, whereby the strips were pressure welded. The resultant material was then heat treated in an argon atmosphere at a temperature of 700 to 1000° C. for 10 minutes, 1 hour and 5 hours.

After the heat treatment, the element comprised outermost layers of niobium stannide which is a solid solution containing zirconium and an intermediate layer of niobium-zirconium alloy, and showed a considerable flexibility.

Specimens were cut out from the material and measurements were taken in the same manner as in Example 1, with the result shown in Table 3.

For control, speciments were prepared by the same method as in Example 1, except that a pure niobium strip was used in lieu of the niobium-zirconium alloy strip. Namely, the control specimens comprised outermost layers of pure niobium stannide and an intermediate layer of niobium. The measurements taken on this control specimens are shown in Table 4. Similarly to the preceding examples, the values of Ic shown in the tables are only of the compound layers and are in terms of A/cm.².

TABLE 3

| Specimen | Treatment | Exterior field 60 KOe. | 80 KOe. |
|---|---|---|---|
| A | Pressure welding only | 0 | 0 |
| B | Heat treatment of A at 1000° C. for 10 minutes | 3.1×10⁵ | 2.4×10⁵ |
| C | Bending of B at 4.5r | 2.1×10⁵ | 1.6×10⁵ |
| D | Heat treatment of A at 1000° C. for 1 hour | 2.2×10⁵ | 1.7×10⁵ |
| E | Bending of D at 4.5r | 1.1×10⁵ | 8.0×10⁴ |
| F | Heat treatment of A at 1000° C. for 5 hours | 1.3×10⁵ | 1.2×10⁵ |
| G | Bending of F at 4.5r | 8.0×10⁴ | 6.0×10⁴ |
| H | Heat treatment of A at 800° C. for 1 hour | 1.1×10³ | 1.1×10³ |
| I | Heat treatment of A at 700° C. for 1 hour | 2.2×10² | 7.0×10¹ |

TABLE 4

| Specimen | Treatment | Exterior field 60 KOe. | 80 KOe. |
|---|---|---|---|
| A′ | Pressure welding only | 0 | 0 |
| B′ | Heat treatment of A′ at 1000° C. for 10 minutes | 2.2×10⁵ | 1.7×10⁵ |
| C′ | Bending of B′ at 4.5r | 1.2×10⁵ | 9.0×10⁴ |
| D′ | Heat treatment of A′ at 1000° C. for 1 hour | 1.8×10⁵ | 1.3×10⁵ |
| E′ | Bending of D′ at 4.5r | 8.0×10⁴ | 6.0×10⁴ |
| F′ | Heat treatment of A′ at 1000° C. for 5 hours | 1.1×10⁵ | 8.0×10⁴ |
| G′ | Bending of F′ at 4.5r | 6.0×10⁴ | 4.0×10³ |
| H′ | Heat treatment of A′ at 800° C. for 1 hour | 2.0×10³ | 1.0×10¹ |
| I′ | Heat treatment of A′ at 700° C. for 1 hour | 1.0×10² | 6.0×10⁴ |

From the tables above, it will be seen that, while both elements are common in that the H–Ic characteristic may be improved by heat treatment at a temperature of 800 to 1000° C. and in that the characteristic will not be deteriorated by bending, the inventive element is far superior to the conventional one in respect to Ic, though the reason therefor is not understood.

Figure 2:
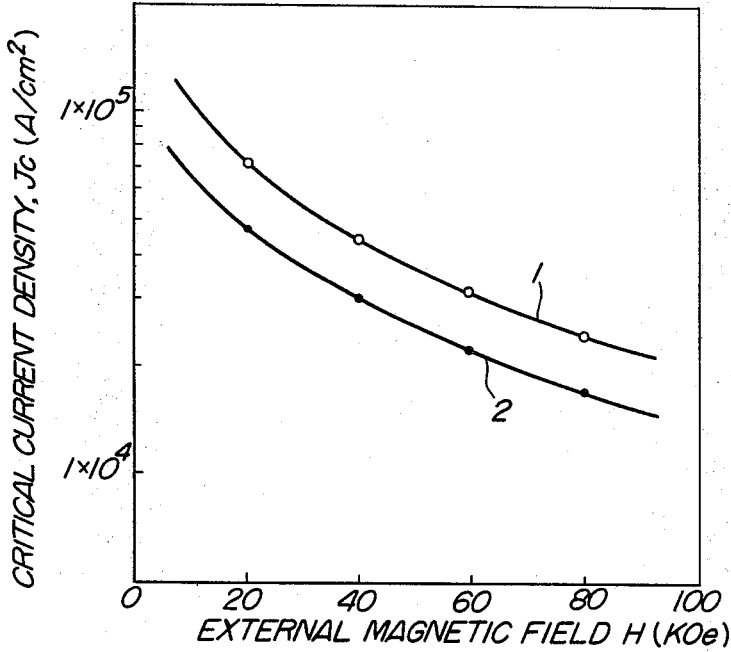

The H–Ic characteristic curves of the specimen B in Table 3 and the specimen B′ in Table 4 are shown in the chart of FIG. 2. In the chart, curve 1 represents the measurements taken on the specimen B and curve 2 the measurements taken on the specimen B′.

This chart clearly shows that the specimen B of the element according to the present invention, which comprises an alloy layer, is usable with a superconducting current which is always greater than that which can be flown through the specimen B′ of the conventional element of the same dimensions, which comprises a niobium layer.

EXAMPLE 3

Various specimens were prepared according to the method illustrated in Example 2 but varying the zirconium content in the niobium-zirconium alloy and conducting the heat treatment at 950° C. for 10 minutes and at 950° C. for 5 minutes. The Ic values measured on the specimens in an exterior field of 80 KOe ore shown in the chart of FIG. 3. In the chart, the solid lines represent the Ic values of the ribbons as a whole, while the dotted lines represent the Ic values of the compound layer only. It will be clear from the chart that addition of Zr to Nb is effective in an amount ranging from 5 to 30 atom percent.

It is to be noted that, although the present invention has been described and illustrated hereinabove in terms of specific examples wherein the element is composed of three layers of tin, niobium-base alloy and tin in the order mentioned, substantially the same results may be obtained from the material composed of a multilayer laminate of tin, niobium-base alloy, tin, niobium-base alloy, . . . niobium-base alloy and tin in the order mentioned.

As will be apparent from the foregoing description, the method of the present invention has the advantages that an elongate element may be produced with more ease and at a cheaper cost than the conventional methods, and further that the element produced by the claimed method has a sufficient flexibility and is usable with a large superconducting current, and, therefore, is highly effectively used as a coil winding for superconducting magnet.

What is claimed is:

1. A composite superconducting element comprising a multi-layer laminate composed of an outermost layer of niobium stannide followed by at least one series of layers, said series consisting of a layer of niobium-base alloy and a layer of niobium stannide wherein said niobium base alloy is selected from the group consisting of a Zr-Nb alloy, a Ti-Nb alloy, a Zn-Ti-Nb alloy, a Ta-Nb alloy, and a Zr-Ta-Nb alloy, and said niobium stannide is a solid solution containing the additive metallic elements in each of the niobium base alloys.

2. A composite superconducting element according to claim 1, wherein said niobium-base alloy is selected from the group consisting of Zr-Nb alloy containing about 5 to about 30 atomic percent of Zr, Ti-Nb alloy containing about 5 to about 30 atomic percent of Ti, Zr-Ti-Nb alloy containing about 5 to about 30 atomic percent of a sum of Zr and Ti, Ta-Nb alloy containing about 5 to about 30 atomic percent of Ta, and Zr-Ta-Nb alloy containing about 5 to about 30 atomic percent of a sum of Zr and Ta.

3. A composite superconducting element of claim 1 wherein said multi-layer laminate is composed of the three layers and consists of a niobium stannide layer, a niobium-base alloy layer and a niobium stannide layer in sequence.

4. A composite superconducting element comprising a multi-layer laminate composed of an outermost layer of tin followed by at least one series of layers, said series consisting of a layer of niobium stannide, a niobium base alloy, niobium stannide and tine wherein the niobium base alloy is selected from the group consisting of a Zr-Nb alloy, a Ti-Nb alloy, a Zr-Ti-Nb alloy, a Ta-Nb alloy, and a Zr-Ta-Nb alloy and wherein said niobium stannide is a solid solution containing the additive metallic elements in the niobium base alloys.

5. A composite superconducting element of claim 4 wherein said multi-layer laminate is composed of the five layers and consists of a tin layer, a niobium stannide layer, a niobium-base alloy layer, a niobium-stannide layer and tin layer in sequence.

6. A composite superconducting element according to claim 4, wherein said niobium-base alloy is selected from the group consisting of Zr-Nb alloy containing about 5 to about 30 atomic percent of Zr, Ti-Nb alloy containing about 5 to about 30 atomic percent of Ti, Zr-Ti-Nb alloy containing about 5 to about 30 atomic percent of a sum of Zr and Ti, Ta-Nb alloy containing about 5 to about 30 atomic percent of Ta, and Zr-Ta-Nb alloy containing about 5 to about 30 atomic percent of a sum of Zr and Ta.

References Cited

UNITED STATES PATENTS

| | | | |
|---|---|---|---|
| 3,293,009 | 12/1966 | Allen et al. | 29—193 |
| 3,309,179 | 3/1967 | Fairbanks | 29—194 |
| 3,310,862 | 3/1967 | Allen | 29—599 |

HYLAND BIZOT, Primary Examiner

E. L. WEISE, Assistant Examiner

U.S. Cl. X.R.

29—198